Jan. 14, 1936.  A. R. KNIGHT  2,027,828
RADIO APPARATUS
Filed Sept. 14, 1932

INVENTOR
ARTHUR R. KNIGHT.
BY
ATTORNEY

Patented Jan. 14, 1936

2,027,828

UNITED STATES PATENT OFFICE 2,027,828

RADIO APPARATUS

Arthur R. Knight, Delaware, Ohio

Application September 14, 1932, Serial No. 633,050

5 Claims. (Cl. 250—20)

My invention relates to a method of radio reception, the utilization of my method of radio reception and to an apparatus for the practice of my method.

It is my object to provide a method, apparatus and circuit for radio signal reception and control utilization whereby the operation of this circuit, when adjusted to a condition of extreme sensitivity accompanied by great unstability, will be upset by the reception of a radio signal and the superposition of its current upon the currents already flowing in the circuit in such a manner as to result in the production of a strong stable plate current which is sufficiently powerful to deflect a meter needle or to actuate a relay for the operation of additional apparatus; by either of which alternatives the circuit may be utilized for the transmission of signals for remote control purposes, for indications of airplane altitude or position, or for various other uses of an audible, visual, tangible or power meter, some of which are hereinafter set forth in more detail.

It is my object to utilize a super-regenerative radio receiving circuit oscillating at two given frequencies and by effecting a special adjustment of the relationship between the two frequencies, causing the circuit so adjusted to become unstable in its operation and then imposing a weak signal upon it while it is in this exceedingly sensitive condition whereupon a relatively large change in the plate current occurs in the circuit, such change being sufficient, for instance, to operate a relay.

It is my object to provide a radio receiver whose output meter deflection is not a function of the radio frequency field intensity below a very low minimum and in which the meter deflection is not a function of radio frequency field strength but in which the output is substantially a linear function of the percentage of modulation.

It is my object to provide a method by which the behavior of a receiving circuit producing two alternating current frequencies within itself, with the intensities or amplitudes thereof adjusted to be equal, can be so modified by the reception and superposition of a signal wave of the same frequency as one of the above mentioned frequencies that the other frequency will cease oscillating, leaving a strong current which is sufficiently powerful to deflect a meter needle or operate a relay, either by itself or when enhanced by audio amplification, thereby becoming capable of performing audible, visual, tangible or apparatus operating functions.

Referring to the drawing:

Figure 1 indicates a typical circuit on which my method may be practiced where the needle deflection is to be directly indicated:

Figure 2 indicates a typical circuit on which my method of adjustment and reception is to be practiced, which employs an audio frequency amplifying circuit on which the needle movement is indicated;

Figure 1:
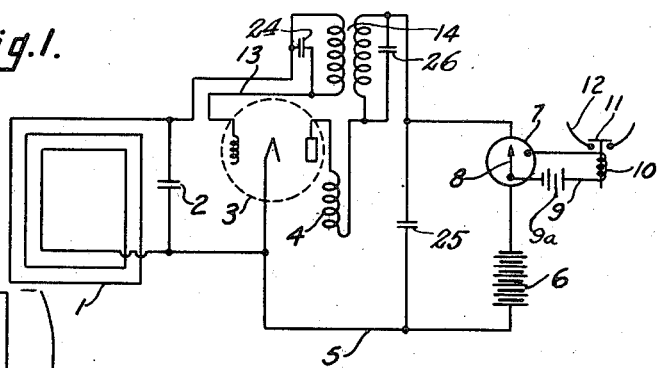
Figure 2:
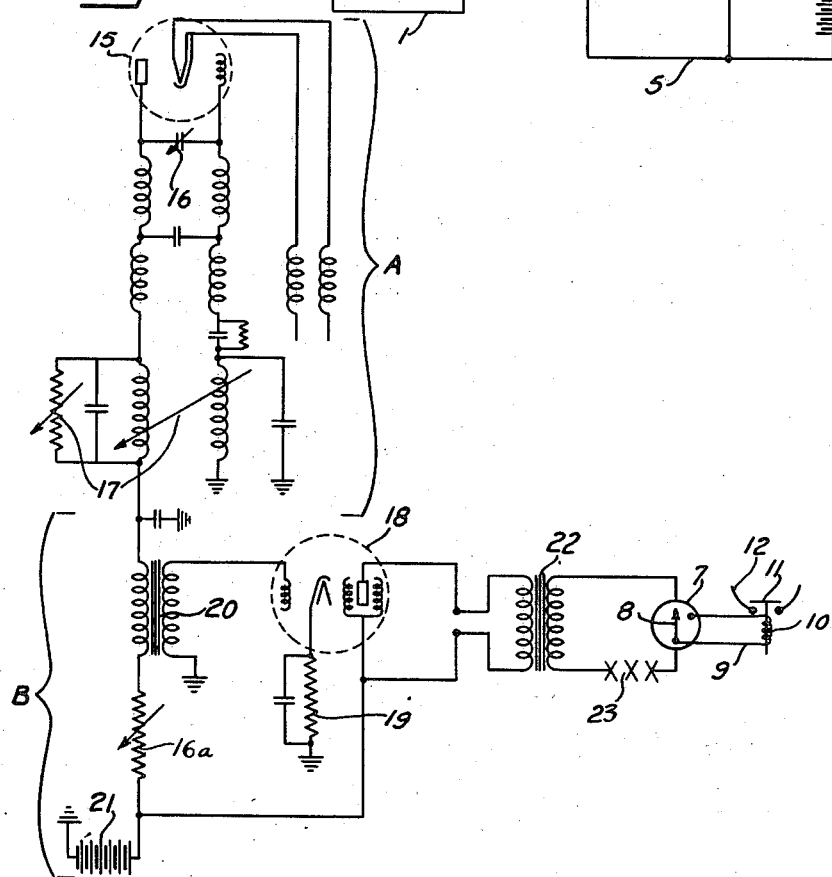

In Figure 1 the receiving set, when adjusted according to my method, operates preferably on a wave length of five meters up to approximately five hundred meters. In Figure 2 the circuit operates between approximately 2.5 meters and five meters. Such limits are approximate and not exclusive.

Referring to the drawing in detail, Figure 1 shows a receiving circuit which is capable of practicing my invention when utilizing transmitting station signals of wave lengths between five meters and five hundred meters approximately. 1 is a loop antenna and 2 a fixed condenser whose inductance and capacity respectively are so chosen and predetermined during the construction of the set that the first resonant circuit which extends through them from the grid of the triode tube 3 on the one side to the filament thereof on the other side (Figure 1) will be fixedly tuned to the reception of the maximum intensity of the single fixed wave length upon which this particular set is designed to operate. This choice of a single fixed wave length is made merely for the sake of convenience and freedom from the danger of the detuning which might accidentally occur if the fixed condenser 2 were replaced by a variable condenser of the type well known in the tuning circuits of radio receiving sets.

Also located in the above first resonant circuit is the fixed grid condenser 24 adjacent to the grid of the triode tube 3, and is of the usual capacity and serves the same purpose that grid condensers customarily serve in radio receiving circuits, as is well known to those skilled in the art. Shunted around the grid condenser 24 is the primary coil of the transformer 14, whose purpose will be hereinafter explained.

On the opposite side of the triode tube 3 from the above-described first resonant circuit is a parallel resonant circuit termed the second resonant circuit, which extends between the filament of the triode tube 3 by way of the line 5 through the fixed condensers 25 and 26 by way of the tickler coil 4 to the plate of the triode tube 3. The fixed condensers 25 and 26 serve to by-pass the radio frequency ripples of the plate current in the plate circuit around the B battery 6 and the meter 7, also around the secondary of the transformer 14, as in the usual manner for parts of a circuit where continuous current is desired and alternating current not desired.

The tickler coil 4 serves the purpose of providing feedback as is usual in regenerative receiving circuits. The meter 7 is a milliameter having a deflection indicating needle 8 which, if desired, may serve to close the connections of a circuit 9 containing a battery 9a and a relay having an operating coil 10, the energization of which, with the circuit so closed, operates a contactor switch 11 for closing a power circuit 12. The latter can be utilized to operate any desired apparatus for remote control and other purposes hereinafter more particularly set forth.

In the manner of adjusting the above circuit resides a very important feature of the invention. During the construction of the set, the resonant circuit containing the loop antenna 1 has been pre-tuned, as previously described, to the frequency (or wave length) of the transmitting station whose signals it is intended to receive. The tickler coil 4 is then adjusted in its proximity to the loop antenna 1 and the regeneration increased until the triode tube 3 starts oscillating at the radio frequency $F_r$ which is of the same frequency as the frequency $F_t$ of the signals of the transmitting station to which the set has been pre-tuned. At the same time through the action of the transformer 14, the triode tube 3 also starts oscillating at variation frequency $F_v$, which is a broader term including the customarily used term "audio frequency" as well as the inaudible frequencies above and below the range of the audible frequencies which, strictly speaking, should only be included in the use of the term "audio frequency".

Ordinarily the amplitudes of oscillation of the variation frequency and radio frequency oscillations thus produced by the oscillation of the triode tube 3 are not equal. In practicing my invention, however, I adjust the circuit until these amplitudes are equal, or in other words, that their intensities are equal. This may be accomplished by a number of ways such as by moving the tickler coil 4 nearer to the loop antenna 1, or by increasing the number of turns used in the tickler coil 4, or by increasing the plate voltage of the triode tube 3.

Figure 3:
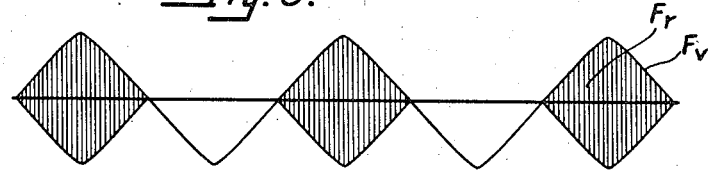
Figure 3 is an indication of the proper combination of variation frequency and radio frequency in the receiving set with which combination the set becomes unstable in its operation and is exceedingly sensitive to very weak signals.

The condition of the radio frequency and audio frequency oscillations produced by the oscillating triode tube 3 when thus adjusted to equal intensities or amplitudes is shown symbolically in Figure 3. It is well known in the radio art that the radio frequency $F_r$ makes full oscillations which are modulated and interrupted in such a manner as to be analogous to half oscillations. The audio or variation frequency $F_v$, however, makes whole oscillations and this is also shown in Figure 3 wherein the unshaded portions between the wave crests beneath the axis line indicate the complete half-oscillations which the radio frequency does not possess.

Thus with the triode tube oscillating simultaneously at both radio and variation frequencies, it has been found that during one-half of the cycle of variation frequency, the regeneration builds up very powerfully, whereas during the next half thereof the regeneration will stop. If for any cause, however, the intensity $F_r$ of the radio frequency oscillations even slightly exceeds the intensity $F_v$ of the variation frequency, the latter stops oscillating altogether. Thus when the set has been adjusted to equal intensities of the radio frequency and variation frequency oscillations as above described, it is then in a state which is extremely sensitive to the reception of weak signals, and also at the same time in an extremely unstable condition. This equality of intensities is indicated in Figure 3 by the complete shading-in of the space within alternate half-cycles of the variation frequency wave curve, the shading representing the radio frequency intensity $F_r$, and the solid line boundary thereof representing the variation frequency intensity $F_v$.

With the set thus adjusted to extreme sensitivity and instability, it is ready for operation, and a signal of the same frequency as the radio frequency oscillations produced within the set itself by the oscillation of the tube 3 is now allowed to impress itself upon the loop antenna 1. The comparatively weak intensity $F_t$ of the transmitted signal thus impressed upon the circuit is nevertheless sufficient to increase the radio frequency intensity $F_r$ by an amount adequate to upset its dynamic balance with the variation frequency intensity $F_v$. The result is that the radio frequency intensity $F_r$ thus added to now exceeds the variation frequency $F_v$, whereupon the latter at once ceases oscillating, leaving the two radio frequency intensities $F_r$ and $F_t$ superposed upon one another and creating the condition shown symbolically in Figure 4. In short, the tube 3 "spills over"—to employ the more familiar radio term describing this phenomenon. This in turn changes the grid bias of the tube 3, which as a consequence results in an enormous increase in the plate current flowing through the second or parallel resonant circuit. The actual increase thus obtained varies with the type of tube used; often it is as much as 100%.

It will thus be noticed that in my invention, the intensity $F_t$ of the transmitting signal as received is of secondary importance, since the phenomenon is a trigger effect occurring with both weak and strong signals. The action of this type of circuit is comparatively insensitive to the influence of damped electromagnetic waves such as arise from the operation of lighting circuits, spark plugs and the remainder of the ignition system of an airplane. It will be observed that my demodulating triode tube 3 oscillates of its own accord at two different frequencies when not receiving a signal and at one high radio frequency when receiving a signal.

According to the type of tubes used, etc. the change in plate circuit, I have experienced, it is as much as seven milliamperes, which is sufficient to operate a rugged relay. For wave lengths above five meters I use this change directly to achieve my end, as in Figure 1. For wave lengths under five meters, I find it desirable to use the circuit shown in Figure 2 where the change in plate current is amplified by means of an ordinary audio amplifier. So sensitive is the meter needle that, in using this apparatus for indicating altitude, the needle deflection will indicate differences in altitude of approximately ten feet.

It will be understood that needle deflection is the linear function of the percentage of modulation and, therefore, as the waves are modulated by difference in altitude, the needle indication indicates the altitude on the scale according to its deflection.

Referring to Figure 2, briefly it consists of an audio frequency circuit indicated at B and a radio frequency circuit indicated at A. It will be noted that the resonant circuit including the tube 15 is a series resonant circuit. The adjustable condenser 16 is adjusted for the reception of some given wave length. I then adjust the potentiometer 16a and the adjustable transformer 17 until the tube 15 oscillates at the proper radio and variation frequencies with equal intensities, as before. 18 indicates an audio frequency amplifying tube, 19 a resistance, 20 a transformer, 21 the B-battery, 22 a step-down transformer, 23 an oxide rectifier and 7 the meter having the needle 8. It will be obvious, however, that if the conditions of usage are sufficiently gentle to permit the use of a sensitive meter and/or relay at 7 and 18, the audio amplifying tube 18, the resistance 19 with its shunted condenser, and the transformer 22 may be dropped from the circuit, and the leads from the meter 7 and the oxide rectifier 23 directly connected to the secondary leads of the transformer 20 in a similar manner to their present connection with the transformer 22, the ground connection of the transformer 20 then being discontinued.

Figure 4:
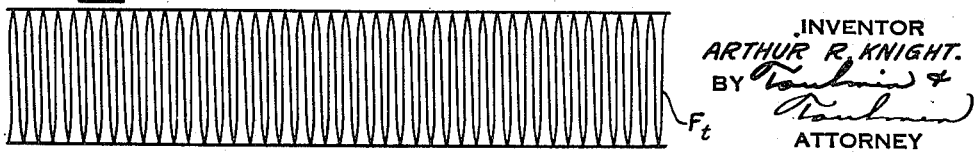
Figure 4 represents a condition of the set when the weak signal is impressed on the circuit by which there is caused a relatively large change in the plate current.

In the diagrams of Figures 3 and 4, as previously explained, but now summarized, $F_v$ indicates the variation frequency produced within the set by the oscillation of the vacuum tube 3; $F_t$ is the signal frequency sent out by the radio transmitting station which it is desired to utilize for operation, and $F_r$ is the frequency produced within the set by the oscillation of the vacuum tube 3, it being of the same frequency as the signal frequency $F_t$, and of the same intensity or amplitude as the variation frequency $F_v$.

My invention thus relates particularly to the special adjustment of the signal and radio frequencies $F_t$ and $F_r$ to the same frequency and of the radio and variation frequencies $F_r$ and $F_v$ to the same intensity of oscillation. It is my invention to produce the above characteristics of the frequencies $F_t$, $F_r$ and $F_v$ to thereby bring about extreme sensitivity accompanied by such instability in the operation of the set as to cause the variation frequncy $F_v$ to cease oscillating the instant that a weak signal of the correct frequency is imposed thereon, thus bringing about a large change in the plate current which may be utilized to operate a meter, or a relay by which other apparatus may be operated.

My invention may be utilized for the remote control of various apparatus by radio signals from the transmitting station adjusted to the proper wave length: the signals will transform the operation of the circuit to work the relay, which in turn will provide current for the apparatus to be controlled. By devices already known to the art, the transmission of different signals may be utilized to control the operation of different apparatus or the same apparatus to produce different results, through the current thus provided from my circuit or from the relay operated by it.

My circuit may also be utilized either to deflect a needle or other visual indicator or give an aural or tangible warning for the purpose of showing the position or altitude of aircraft and to facilitate the landing or blind flying thereof. For the transmission of such signals, radio beams are used, having very narrow widths: these beams are polarized either vertically when used for boundary or position determination, or horizontally when used for blind landing or for altitude determinations. When the aircraft flies through the beam, the warning will be registered visually by the indicator, aurally by the sounding of an audible note or tangibly by a warning device affecting the sense of touch of the aircraft pilot.

My invention may furthermore be utilized for intercommunication between the various units of an aircraft squadron. The leader's airplane may be equipped with a transmitting set of a certain wave length and the airplanes of his squadron equipped with my receiving apparatus adjusted for the same wave length. In a manner similar to that previously described, the signals sent out by the leader's transmitting set may be caused to upset the operation of the receiving sets in the other airplanes and cause the indicators or relays thereby actuated to give rise to a visual, aural or tangible warning or signal. By a pre-arranged set of signals, the orders of the leader are thus transmitted to his followers despite the noise of the airplane itself, this latter having been previously a serious impediment to the use of radio in military flying.

Collisions may likewise be prevented by the utilization of my apparatus. The ships are caused to send out signals from their transmitting sets on a certain wave length, the reception of which actuates a warning signal in the manner described above, either visually, aurally or tangibly. Police communication may likewise be accomplished, the warning being given when the central station is calling the patrol cars.

It will be understood that while two embodiments of the invention have been described by way of example, the invention itself is by no means limited to these two embodiments: I desire to comprehend within my invention such modifications as may be necessary to adapt it to varying conditions and uses.

Having thus fully described my invention, what I claim as new and desire to secure by Letters Patent, is:

1. In a method of radio reception which utilizes a regenerative radio receiving circuit, adjusting a resonant circuit to a given frequency which it is desired to receive, setting the vacuum tube in oscillation at radio frequency, likewise setting the tube in oscillation at variation frequency, adjusting the intensity of oscillation of the radio frequency and variation frequency to be equal, admitting a signal wave having the same frequency at which the resonant circuit is adjusted, whereby the variation frequency ceases oscillation and causes a substantial change in the plate circuit current, and utilizing the thus increased plate circuit current to operate electrical indicating devices.

2. In a method of radio reception which utilizes a regenerative radio receiving circuit, adjusting a resonant circuit to a given frequency which it is desired to receive, setting the vacuum tube in oscillation at radio frequency, likewise setting the tube in oscillation at variation frequency, adjusting the intensity of oscillation of the radio frequency and variation frequency to be equal, admitting a signal wave having the same frequency at which the resonant circuit is adjusted, whereby the variation frequency ceases oscillation and causes a substantial change in the plate circuit current, subjecting the thus-increased plate circuit current to further amplification, and utilizing the amplified current to operate other electrically-actuated devices.

3. In a method of radio reception which utilizes a regenerative radio receiving circuit, adjusting a resonant circuit to a given frequency which it is desired to receive, setting the vacuum tube in oscillation at radio frequency, likewise setting the tube in oscillation at variation frequency, adjusting the intensity of oscillation of the radio frequency and variation frequency to be equal, admitting a signal wave having the same frequency at which the resonant circuit is adjusted, whereby the variation frequency ceases oscillation and causes a substantial change in the plate circuit current, utilizing the thus-increased plate circuit current to operate electrical relay means arranged to control a relay circuit including other electrically-actuated devices and supplying electrical energy to said relay circuit whereby to cause the energization of said relay circuit and the operation of said other electrically-actuated devices in response to said plate circuit current changes.

4. In a method of radio reception which utilizes a regenerative radio receiving circuit, adjusting a resonant circuit to a given frequency which it is desired to receive, setting the vacuum tube in oscillation at radio frequency, likewise setting the tube in oscillation at variation frequency, adjusting the intensity of oscillation of the radio frequency and variation frequency to be equal, and admitting a signal wave having the same frequency at which the resonant circuit is adjusted, whereby the variation frequency ceases oscillation and causes a substantial change in the plate circuit current.

5. In combination in a radio receiving set, a resonant circuit tuned to the reception of a given frequency of a signal wave, a thermionic vacuum tube, a parallel resonant circuit containing a regenerative feed-back coil in the plate circuit thereof, means for energizing the filament of said thermionic tube, a source of plate current, an indicating device adapted to be actuated by variations in the plate current, and a transformer coupled between said first-mentioned resonant circuit and said parallel resonant circuit, whereby the thermionic tube may be caused to oscillate simultaneously at radio and variation frequencies with equal intensities thereof, and means for impressing a signal wave of the same frequency as the radio frequency upon the receiving circuit, whereby the variation frequency is caused to cease oscillation and a large change in plate current is produced.

ARTHUR R. KNIGHT.